Aug. 30, 1949.    O. BRUMMER    2,480,116
OIL SEAL MEANS OR THE LIKE
Filed Oct. 3, 1945    2 Sheets-Sheet 1

Inventor:
Olin Brummer
By A. Trevor Jones
Atty.

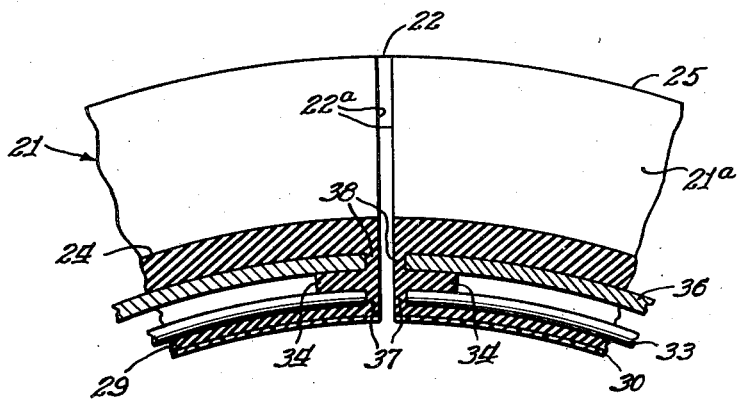
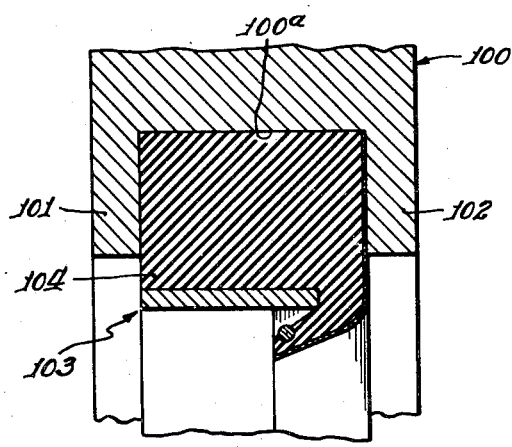

Patented Aug. 30, 1949

2,480,116

UNITED STATES PATENT OFFICE 2,480,116

OIL SEAL MEANS OR THE LIKE

Olin Brummer, Oak Park, Ill.

Application October 3, 1945, Serial No. 619,992

7 Claims. (Cl. 288—2)

This invention relates to an improved oil seal means or the like and has for one of its important objects the provision of a device for sealing oil or other liquid against leakage around a rotating shaft, and more particularly for example the crank shaft of an internal combustion engine, while at the same time acting as a packing or gasket to prevent leakage past other points including the region of contact between the seal device and the engine block or similar housing in which the shaft rotates.

One of the important objects of the present invention is the simplification of a device of this class and the accomplishment of an effective seal, together with a structure which is substantially incapable of being incorrectly located in position, which consists of a single unitary operative structure, and which is retained in position by the assembly of the sections of the engine block, for example, without the necessity of using screws, bolts, extraneous springs or other fastening or pressure creating expedients.

The marked simplicity and efficiency of the device will be readily apparent from the following description, taken together with the accompanying drawings of an illustrative embodiment of the invention, and in which drawings:

Figure 4 is a fragmentary sectional view taken on the line 4—4 of Figure 3; and

Figure 5 is a fragmentary view in cross-section showing a modified form embodying the invention.

Figures 1, 2, 3:
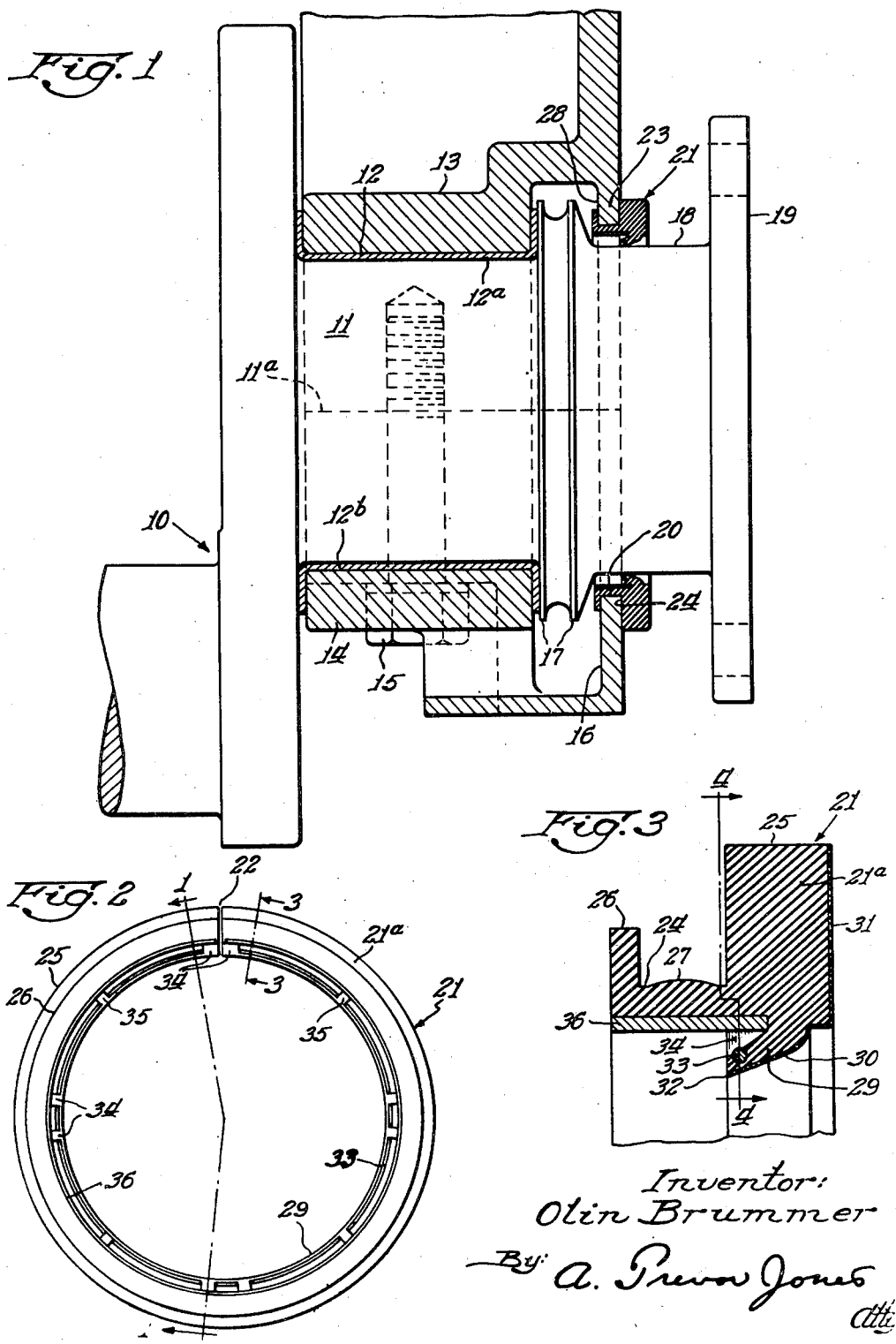
Figure 1 is a sectional view of the pertinent parts of a motor block or the like and of the device of the present invention applied thereto and to the motor driving shaft, which is shown in elevation but broken away to save space, and this view being, so far as the device of the present invention itself is concerned, a section taken on the line 1—1 of Figure 2.
Figure 2 is an end view, and which may be, for example, like Figure 1, of full size, of the seal device itself separated from the remainder of the structure of Figure 1, and looking at the seal device from the left-hand end of the structure as seen in Figure 1.
Figure 3 is a section, somewhat enlarged, taken on the line 3—3 of Figure 2.

Referring in detail to the illustrative construction shown in the drawings, the numeral 10 may indicate the crank shaft of an internal combustion engine or motor, and which includes a journal portion 11 rotatable in the usual bearing sleeve element 12. The latter, as is well known, may be formed in mating halves 12a and 12b, which are carried respectively by the similarly mating upper section 13 and lower section 14 of the engine block, which may be suitably secured together as by the usual machine screw bolts, one of which is indicated at 15. The engine block bearing may be split along the line 11a and may include an oil chamber 16 within which may rotate the oil throw flanges 17—17 integral with the crank shaft and beyond which the crank shaft may extend as at 18, projecting from the engine block and conventionally enlarged say as at 19 to have secured thereto the conventional fly-wheel, which need not be here shown. It is the opening 20 through which the crank shaft projects hereat that is desired to be sealed against the leakage of oil therethrough and to which accomplishment the means of the present invention is directed.

In accordance with the present invention, I provide a seal device 21 comprising a body 21a of desirably rubber-like material, for example one of the synthetic elastomers, such as neoprene, which are now readily available and which may be readily molded, under the influence of heat and pressure, to the desired form, and which will withstand heat, cold, the action of light, lubricants and chemicals without appreciable deterioration.

The body 21a as here shown is in the form of a split annulus and desirably split at only one point as at 22 (Fig. 2) so as to be of one piece, and which is adapted to interlock with the marginal portion 23 of the motor block, that is to say, there being an annular groove in one of these members, in this instance in body 21a, in which the other member, in this instance the marginal portion 23 of the motor block, is snugly received against the sealing resilience of the elastic body 21a. Specifically, as here shown the marginal portion 23 is in the form of an inwardly directed flange which approaches the shaft projecting portion 18 and the edge of which flange defines the opening 20 about the shaft.

The annular radially facing groove 24, here formed in the body 21a, opens into the outer periphery of the body and is in this instance the result of forming the body with a pair of radially enlarged portions 25 and 26 at each end respectively, at a distance apart such that the body may be forced onto the engine block flange portion 23 against the resilience of the elastic material body and which flange portion is then snugly received in the annular groove 24, throughout its periphery. As best seen in Figure 3 the inner surface of the groove 24 is desirably slightly cambered as at 27 so as to be placed under compression and resiliently somewhat flattened out when the body is located in position as shown in Figure 1, thus enhancing the sealing effect. Furthermore, the annulus is of a diameter such that when in position as just described, the joint at 22 is firmly pressed together.

As will be noted, the radially enlarged portion 25 of the body 21a is preferably substantially larger both in a radial and axial direction than the companion enlarged portion 26. This is for a number of desirable purposes, one of which may be mentioned at this point and which is to insure that the device 21 shall be assembled with the engine block in only one way and thus guarding against accidental or incorrect assembly, since as will be seen from Figure 1, the space between oil throw flanges 17 of the shaft and the motor block 23 would not permit the body 21 to be placed in position in a reversed or incorrect manner with the enlarged portion 25 of the body abutting the inner face 28 of the motor block flange 23.

Another important advantage of the body enlarged portion 25 is that it forms a foundation for the sealing lip 29 which is shown formed integrally with the body 21a and extending diagonally inwardly from the inner periphery of the body 21a throughout its circumference and lapping the main portion of the body so as to bear by a friction contact upon the shaft portion 18 throughout its circumference. The sealing lip 29 desirably bears on the shaft through the intermediation of the fabric facing 30 which is in practice molded with and to the body 21a and preferably being continued as at 31 along the right-hand end face of the body for both security and the avoidance of a free edge on the fabric facing other than at the free edge 32 of the sealing lip. It will be understood that, as so molded, the fabric, which may be say of cotton-duck, is to a large extent embedded in and bonded with the initially plastic material of the body 21a during the molding process.

Adjacent the free edge of the sealing lip 29 but out of contact with the shaft is shown embedded a wire spring 33 which may be a piece of steel wire, such as piano wire, formed into a split annulus to conform to the form of the body 21a and which serves to enhance the resilience of and somewhat yieldingly stabilizes and supports the sealing lip 29, while also serving to cause the device to accommodate itself to wear in the shaft bearings and any permanent set which may therefore develop in the rubber-like body as a result. The sealing lip may be also further somewhat stabilized and supported by a series of fillets 34 which are arranged in pairs at each quarter circle of the circumference, as best seen in Figure 2, and which extend between the main portion of the body 21a and the sealing lip 29. At other spaced apart intervals thereabout, as for example, at quarter circles terminating intermedially between a pair of fillets 34, another single such fillet 35 may occur. As seen from Figure 2, the split 22 of the annulus desirably occurs between the fillets of one pair of fillets 34, so that there is a fillet immediately adjacent the split 22 on each side thereof. The inside diameter of the annulus is desirably slightly less than the diameter of the shaft portion 18 so that the sealing lip 29 is expanded to adjust itself to the shaft diameter.

Further in accordance with the present invention, the body 21a is faced on its inner periphery, just inside of the sealing lip 29, with a metallic band 36 preferably of steel, having its flat surface extending axially of the body and which serves to enhance the resilience of and somewhat yieldingly stabilize and support the body 21a as a whole and compensate for torsional stresses, while leaving the sealing lip 29 at least in part independently so served by the more yielding wire spring 33. The metallic band 36 also assists in maintaining the body 21a in split annular formation while resisting deformation except the desired limited deformation more or less to or from a closed annulus, which latter limited deformation permits the device 21 to accommodate itself in annular sealing relationship both to the shaft 18 and to the engine block marginal flange 23. Undesirable deformation, that is, axially of the shaft, for example, is inhibited by the relatively broad band 36 which while flexible longitudinally is relatively rigid transversely.

As indicated in Figure 4, both the spring wire 33 and the band 36 desirably terminate just slightly short of the abutting ends 22a of the rubber-like body 21a, at the joint 22, as indicated at 37—37 and 38—38 respectively, so that when the split 22 is closed when the device 21 is in position, which occurs since the device is of sufficiently large diameter to encircle the shaft 18 with the joint 22 closed, the latter takes what might be called a rubber-to-rubber abutment without interference with this rubber-to-rubber abutment by the metal members 33 and 36, and so as to seal the joint at this point, by a somewhat wedging action.

In molding the body 21a, it will be understood that the metal members 33 and 36 together also with the fabric facing 31 are present in the mold cavity with the synthetic rubber stock to form the body 21a, so that the body is molded with the other members imbedded therein and vulcanized or bonded thereto during the vucanization step which occurs during molding. The device 21 therefore comes out of the mold a complete unitary article, initially a complete annulus, which is then cut as shown at 22, Fig. 2, between the ends of the metal members 33 and 36 desirably by a sharp clean stroke of a knife or the like without removing material from the body. In practice, the fabric is thereafter greased as with graphite.

In placing the sealing device in position on the flange 23, this is commonly done with half of the engine block, that is, the half section 13 lowermost, and with the crank shaft portion 18 in position therein on the half bearing sleeve element 12a. The device 21 is then slipped over the shaft, by spreading the annulus sufficiently so that it will pass over the shaft, and into position on the half of the flange 23 which is carried by the block section 13. The engine block half section 14 is then placed in position and secured to the half section 13 as by the screw bolts 15, with the other half of the flange 23 now also in engagement with the device 21 as indicated, and the screwing home of the bolts 15 at the same time clamps and secures the seal device 21 in position against displacement and for enhanced sealing action without the necessity of extraneous plates, bolts, screws or springs.

As shown in Figure 5, engine block flange 100 corresponds somewhat to the flange 23 of Figure 1, but in this instance the flange 100, instead of being a simple flange, terminates in a pair of spaced apart flanges 101 and 102 which between them provide an annular groove 100a.

Corresponding to this modified structure, the seal device 103 may in this instance have a body 104 of more rectangular cross-section to fit snugly into the annular groove 100a, and being otherwise similar to and functioning in substantially the same way as the device 21.

Thus, the invention finds adaptation readily to either the simple flange 23, with the annular groove in the device 21, or, reciprocally, as in Figure 5, to the compound flange 100, with the annular groove in the flange and the device fitting thereinto.

It is not intended to be understood that the invention is limited to all details of construction here shown for purposes of exemplification and it is to be understood that such changes may be made as fall within the scope of the appended claims without departing from the invention.

The invention having been described, what is here claimed is:

1. Oil seal means or the like comprising a resilient arcuate body of rubber-like material having a portion of relatively large cross-section and an integral sealing lip of relatively small cross-section extending somewhat obliquely from the first mentioned portion and having a relatively sharp bearing edge radially spaced from the first mentioned portion, a metal arcuate band carried by the first mentioned portion, said band having its flat surfaces extending axially of the body and having ends terminating within the body, and an arcuate wire embedded in the lip between said band and said bearing edge and also having ends terminating within the body.

2. The structure of claim 1 wherein the means is in the form of a single-split annulus and the ends of the band and wire terminate within the body closely adjacent the said split in the annulus and on opposite sides thereof, there being a band termination and a wire termination at each side of said split.

3. The structure of claim 1 wherein the body carries integral circumferentially spaced fillets extending between the body first mentioned portion and the lip, adjacent the bearing edge of the lip.

4. The structure of claim 1 wherein the means is in the form of a single-split annulus and the body carries integral circumferentially spaced fillets extending between the body first mentioned portion and lip adjacent the bearing edge of the lip and there is one of said fillets at each end of the body extending circumferentially beyond an end of each of said band and said wire.

5. The structure of claim 1 wherein the band and wire are of spring metal and the lip is faced with fabric, the wire being of piano-wire character.

6. The structure of claim 1 wherein the body first mentioned portion has a peripheral outwardly radially facing annular groove adapted to snugly receive a bearing block flange.

7. Oil seal means or the like comprising a resilient arcuate body of rubber-like material having a portion of relatively large cross-section and an integral sealing lip of smaller cross-section extending inclinedly from the first-mentioned portion and having a bearing edge radially spaced from the first-mentioned portion in the plane of said first-mentioned portion, a metal arcuate band carried by the first-mentioned portion between said first-mentioned portion and said lip, said band having its flat surfaces extending axially of the body, and an arcuate wire carried by said lip between said band and said bearing edge, the body being formed initially as a complete annulus and being thereafter severed between adjacent ends of the band and wire, said band and said wire having ends terminating within the body.

OLIN BRUMMER.

REFERENCES CITED

The following references are of record in the file of this patent:

UNITED STATES PATENTS

| Number | Name | Date |
|---|---|---|
| 1,690,839 | Roth | Nov. 6, 1928 |
| 1,847,414 | Smith | Mar. 1, 1932 |
| 2,015,831 | Winter | Oct. 1, 1935 |
| 2,146,677 | Johnson | Feb. 7, 1939 |
| 2,151,410 | Richter | Mar. 21, 1939 |
| 2,208,482 | Victor | July 16, 1940 |
| 2,272,650 | Von Veh | Feb. 10, 1942 |
| 2,305,282 | Taylor et al. | Dec. 15, 1942 |
| 2,348,587 | Antonelli | May 9, 1944 |
| 2,361,139 | White et al. | Oct. 24, 1944 |
| 2,417,390 | Winkeljohn | Mar. 11, 1947 |
| 2,437,900 | Winkeljohn | Mar. 16, 1948 |

FOREIGN PATENTS

| Number | Country | Date |
|---|---|---|
| 551,152 | Great Britain | 1943 |
| 700,403 | Germany | 1940 |
| 874,527 | France | 1942 |